United States Patent Office 3,193,303
Patented July 6, 1965

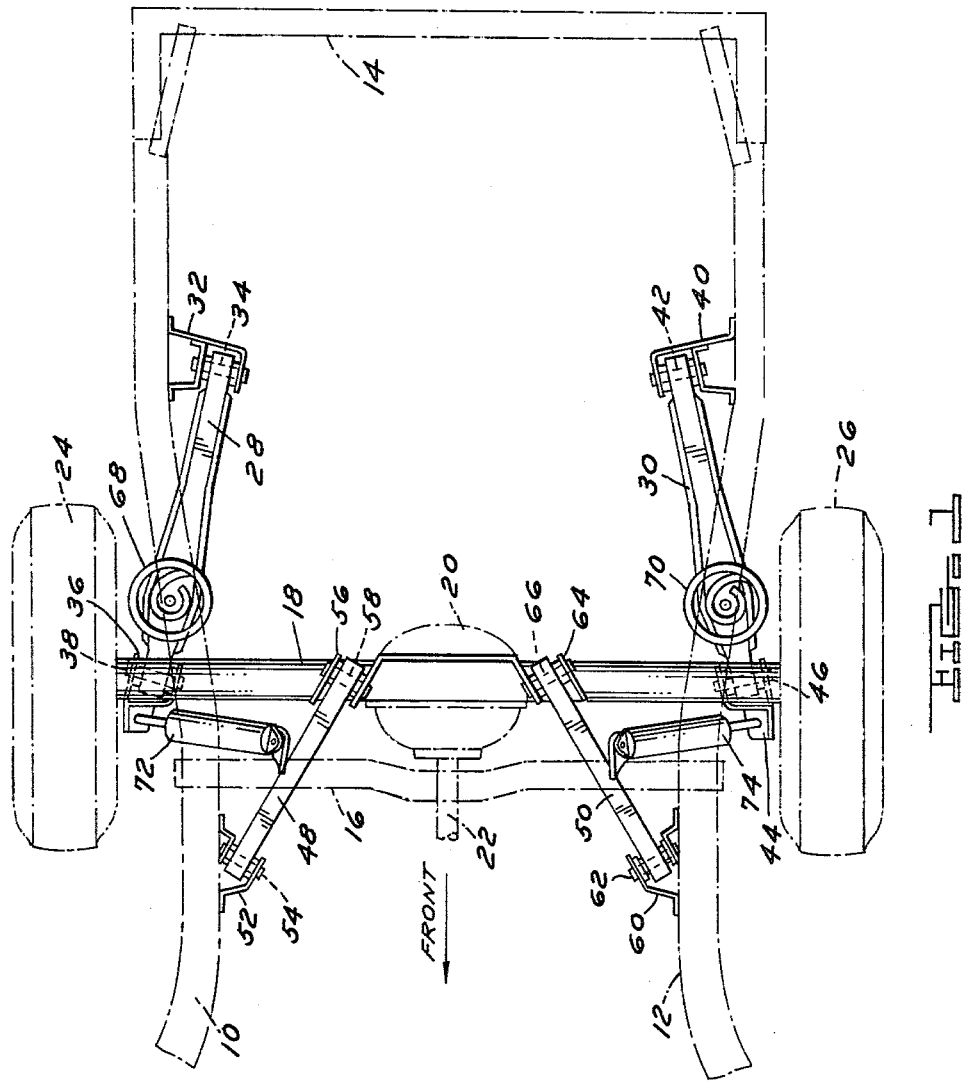

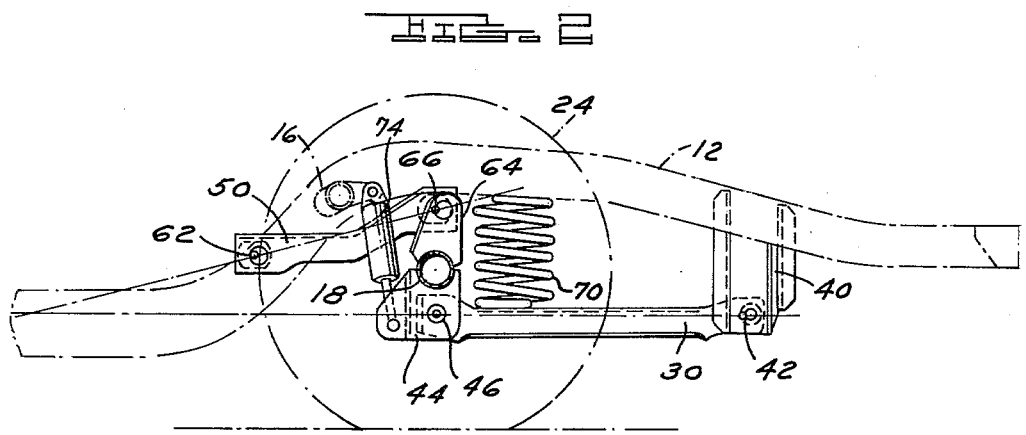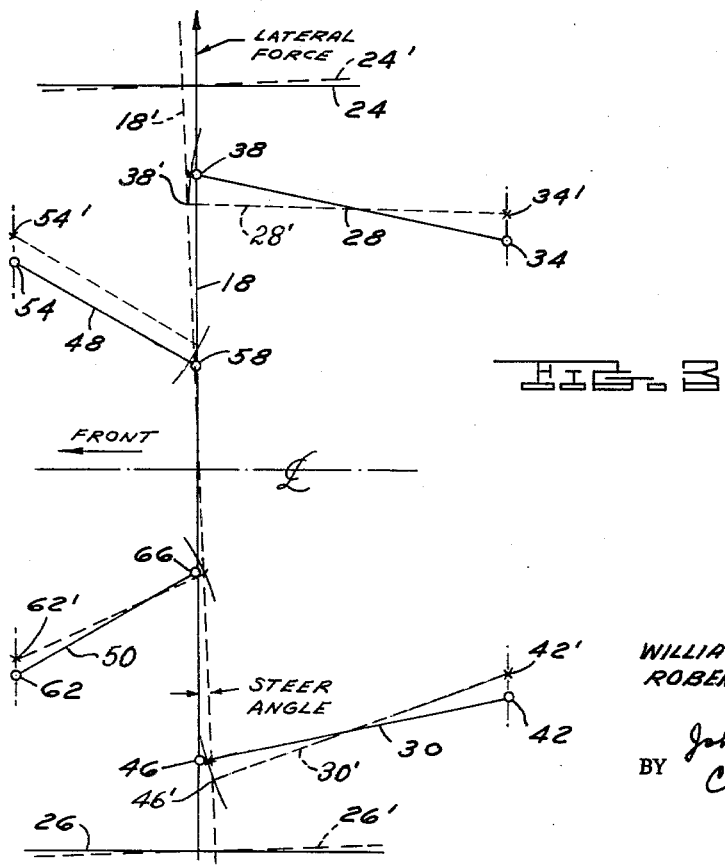

3,193,303
MOTOR VEHICLE SUSPENSION SYSTEM OF A
LINKAGE TYPE
William D. Allison, Grosse Pointe Farms, and Robert D.
Negstad, Dearborn, Mich., assignors to Ford Motor
Company, Dearborn, Mich., a corporation of Delaware
Filed Nov. 29, 1963, Ser. No. 326,938
4 Claims. (Cl. 280—124)

The present invention relates generally to motor vehicle suspensions and more particularly to suspension systems of the linkage type.

In the presently preferred embodiment of this invention, four links or arms are employed to locate a solid rear axle. Two upper arms extend forwardly, outwardly and downwardly from spaced pivot brackets attached to the tubular axle housing. Two lower arms are attached to widely spaced pivot brackets below the axle housing. The lower arms lie in a generally horizontal plane and converge inwardly and rearwardly. The forward ends of the upper arms and the rearward ends of the lower arms are joined to vehicle chassis structure by suitable brackets. The ends of all the arms are connected by resilient bushings.

When a side force, such as a centrifugal force, is applied to the vehicle body controlled lateral movement relative to the axle is allowed. The lateral displacement is permitted by radial deflection of the eight resilient bushings or pivots at the ends of the four suspension arms, by the torsional deflection of the axle housing and by the deflection of the arms and attaching brackets.

This lateral body movement results in rear axle steering and is controlled by the angular arrangement of the four suspension arms and the deflection of the various components. The particular arrangement of the suspension arms and the pivots in the preferred embodiment of the present invention steers the wheels in a direction to oppose the side forces creating the lateral displacement. This condition, when applied to a rear suspension, is referred to as understeer.

Therefore, in accordance with the present invention it is an object to provide a vehicle suspension having controlled rear understeer proportional to side forces at the axle.

It is also an object of the invention to reduce road harshness by absorbing the "sideways push" of a conventional solid axle on irregular road surfaces by means of a resiliently mounted linkage system and shock absorbers.

It is another object of this invention to provide a suspension that minimizes the effect of body roll on rear suspension steering.

A further object of the invention is to provide a spring base using coil springs that is as wide as the spring base available with leaf springs.

It is a general object of the present invention to provide in vehicles, a suspension that is characterized by improved road handling, road holding and control in wind.

The many objects and advantages of the present invention will be more fully comprehended upon consideration of the following discussion and the accompanying drawings, in which:

FIGURE 1 is a top plan view of a vehicle incorporating a suspension according to this invention;

FIGURE 2 is a side elevational view of the suspension of FIGURE 1; and

FIGURE 3 is a schematic plan view disclosing the deflection of the suspension components of FIGURE 1.

Referring now to the drawings for a better understanding of the invention, FIGURE 1 illustrates a rear suspension for a passenger automobile.

The chassis of the vehicle of FIGURE 1 includes a right frame side rail 10 and a left side rail 12. The side rails 10 and 12 are connected at their rear ends by a rear cross frame member 14 and a forward cross member 16.

The unsprung components of the suspension include an axle housing 18 having a centrally situated differential gear unit 20. The gear unit 20 receives power from a propeller shaft 22 and distributes torque through axle shafts contained within the axle housing 18. Right and left road wheels 24 and 26 are rotatably fitted at the outer ends of the axle housing 18 and receive driving torque from the axle shafts contained therein.

According to the present invention, suspension means are provided to interconnect the axle housing 18 and the chassis frame members. The suspension means include a pair of lower suspension arms 28 and 30 that lie in a generally horizontal plane. A bracket 32 is secured to the frame side rail 10 and by means of a resilient bushing 34 pivotally supports the rear end of the right lower arm 28. A bracket 36 is welded to the right-hand end of the axle housing 18 and extends downwardly therefrom. A resilient bushing 38 pivotally connects the forward end of the arm 28 to the axle bracket 36.

Similarly, a frame bracket 40 has a resilient bushing 34 pivotally connected to the rear end of the left lower arm 30. A depending bracket 44 is welded to the left end of the axle housing 18 and carries a resilient bushing 46 for the pivotal support of the front end of the left suspension arm 30.

The axle housing 18 is also positioned by a pair of upper suspension arms 48 and 50. Right upper arm 48 is pivotally connected to a frame bracket 52 by a resilient bushing 54 and to an axle housing bracket 56 by a resilient bushing 58. The left upper arm 50 is pivotally connected to a frame bracket 60 by a resilient bushing 62. A bracket 64 is welded to and extends upwardly from the axle housing 18. A resilient bushing 66 pivotally connects the rear end of the upper left arm 50 to the axle bracket 64.

As will be observed in the plan view, FIGURE 1, both the lower arms 28, 30 and the upper arms 48, 50 extend in a forwardly and outwardly direction. The purpose of this arrangement will be explained later.

Means are provided to resiliently support the chassis upon the unsprung suspension components. This objective is achieved by interposing a right coil spring 68 between the right lower suspension arm 28 and the right frame rail 10. A second coil spring 70 is interposed between the left lower suspension arm 30 and the left frame side rail 12. A pair of telescopic shock absorbers 72 and 74 dampen relative movement between the sprung and unsprung components. The right-hand shock absorber 72 has one end connected to the axle bracket 36 and its other end connected to a bracket extending from the cross frame member 16. The left shock absorber 74 is interposed between the left axle housing bracket 44 and a bracket extending from the cross member 16. It is to be noted that the shock absorbers 72, 74 extend upwardly, inwardly and slightly forwardly from the axle housing brackets 36, 44.

With the suspension of FIGURES 1 and 2, the axle housing 18 and wheels 24, 26 are positioned longitudinally with respect to the frame by the lower suspension arms 28, 30 and by the upper suspension arms 48, 50. These suspension arms absorb any longitudinal forces such as occur during braking and accelerating.

As indicated in the previous discussion, the eight pivots that connect the ends of the suspension arms 28, 30, 48 and 50 to the frame side rails 10, 12 and axle housing 18 are all of the resilient bushing type. By using resilient bushings, limited flexibility is introduced into the suspension system. These bushings permit the chassis to move laterally with respect to the axle housing 18 when it is subjected to side forces. The suspension arms are arranged in a unique manner so that any lateral movement will be accompanied by a canting of the axle 18 whereby wheels 24, 26 will be shifted with respect to the chassis in a direction to provide an understeer effect.

The relationship of the several components of the suspension is illustrated schematically in FIGURE 3. The solid lines illustrate the relationship of the lower arms 28, 30 and the upper arms 48, 50 with respect to the axle housing 18 and wheels 24, 26 during normal or static conditions. When the vehicle chassis is subjected to a lateral force tending to push it to the right, such as the centrifugal force occurring during a left-hand turn, the components will shift to the dotted-line position. This shift or displacement is permitted by the flexibility of the resilient bushings. As a result of this displacement, the chassis pivots for the lower suspension arms are moved to the locations identified by reference numerals 34' and 42'. Similarly, the chassis pivots for the upper arms 48, 50 are relocated to the points 54' and 62'. This shifting changes the angualr relationship between the various suspension arms and the longitudinal center line of the vehicle. The displacement of the right lower arm 28 to its new location 28' will cause its axle housing pivot 38 to move forwardly to a new location 38'. The pivot 46 for the left arm 30 is moved rearwardly to the point 46'. The axle pivot 58 and 66 for the upper arms 48 and 50 shift a corresponding amount.

The angular movement of the arms resulting from the lateral movement of the pivots causes the axle housing 18 and the wheels 24, 26 to be shifted in a direction to provide a steering effect. The wheels 24, 26 will no longer parallel to the center line of the vehicle, but will assume a slight angle as indicated by the dotted lines 24', 26'. Thus, the lateral shifting of the chassis or body produces a steering effect. The lower arms 28, 30 as well as the upper arms 48, 50 extend in a forwardly and outwardly direction so that the steering effect produced will be in the direction of understeer.

It has been discovered that a vehicle suspension having understeer characteristics according to applicants' invention, meets the many objects set forth previously. Specifically, a vehicle with a suspension having these characteristics will have superior ride and handling qualities.

Modifications and alterations of this invention may occur to those skilled in the art. Such changes will nevertheless come within the scope and spirit of the following claims.

What is claimed as new is:

1. A vehicle suspension system having a chassis frame, a transverse axle, a road wheel rotatably mounted at each end of said axle, a pair of separate suspension arms connected to said axle by spaced apart resilient pivots, said arms extending rearwardly and inwardly from said axle, the rear ends of said suspension arms being connected to said chassis frame by spaced apart resilient pivots, a second pair of separate suspension arms connected to said axle by spaced apart resilient pivots, said second arms extending forwardly and outwardly from said axle and having their forward ends connected to said chassis by spaced apart resilient pivots, said suspension arms and pivots being adapted to permit lateral movement of said chassis with respect to said axle and said wheels when subjected to lateral forces thereby causing said axle and said wheels to move in a direction to provide an understeer effect.

2. A vehicle suspension system having a chassis frame, a transverse axle, a road wheel rotatably mounted at each end of said axle, a pair of separate suspension arms connected to said axle, said arms extending rearwardly and inwardly from said axle, the rear end of said suspension arms being connected to said chassis frame by spaced apart pivots, a second pair of separate suspension arms connected to said axle by spaced apart pivots, said second arms extending forwardly and outwardly from said axle and having their forward ends connected to said chassis, said chassis being adapted to move laterally with respect to said axle when subjected to lateral forces and thereby causing said axle and said wheels to move in a direction to provide an understeer effect.

3. A vehicle suspension system having a chassis, unsprung components and suspension means interconnecting said chassis and said components, said components including a rigid axle and a pair of road wheels rotatably connected to said axle, said suspension means including a pair of mutually independent upper suspension arms interconnecting said axle and said chassis and a pair of mutually independent lower suspension arms interconnecting said axle and said chassis, a resilient bushing providing a pivotal connection at each of the ends of said suspension arms, said lower suspension arms being inclined with respect to each other in a forwardly and outwardly direction, said upper suspension arms being inclined with respect to each other in a forwardly and outwardly direction, spring means resiliently supporting said chassis upon said unsprung components.

4. A vehicle suspension system having a chassis, unsprung components and suspension means interconnecting said chassis and said components, said components including an axle and a pair of road wheels rotatably connected to said axle, said suspension means including a first pair of mutually independent suspension arms interconnecting said axle and said chassis and a second pair of mutually independent suspension arms interconnecting said axle and said chassis, a resilient bushing providing a pivotal connection at each of the ends of said suspension arms, the arms in each of said pair of arms being inclined with respect to each other in a forwardly and outwardly direction, spring means resiliently supporting said chassis upon said unsprung components.

References Cited by the Examiner

The following references, cited by the examiner, are of record in the patented file of this patent:

UNITED STATES PATENTS

| 2,300,844 | 11/42 | Olley | 180—73 |
| 2,746,766 | 5/56 | Nallinger | 280—124 |
| 2,919,760 | 1/60 | Fehlberg | 267—66 X |

A. HARRY LEVY, *Primary Examiner.*